(12) United States Patent
Apelqvist

(10) Patent No.: US 8,321,557 B2
(45) Date of Patent: Nov. 27, 2012

(54) WEB FEEDS OVER SIP

(75) Inventor: Johan Anders Apelqvist, Hjarup (SE)

(73) Assignee: Sony Mobile Communications AB, Lund (SE)

(\*) Notice: Subject to any disclaimer, the term of this patent is extended or adjusted under 35 U.S.C. 154(b) by 400 days.

(21) Appl. No.: 11/869,912

(22) Filed: Oct. 10, 2007

(65) Prior Publication Data

US 2009/0100124 A1 Apr. 16, 2009

(51) Int. Cl.
*G06F 15/173* (2006.01)
*G06F 15/16* (2006.01)
*G06F 3/00* (2006.01)

(52) U.S. Cl. .................. 709/224; 709/206; 719/318
(58) Field of Classification Search .................. 709/224, 709/227, 206; 370/352; 719/318
See application file for complete search history.

(56) References Cited

U.S. PATENT DOCUMENTS

| | | | | |
|---|---|---|---|---|
| 5,878,213 A * | 3/1999 | Bittinger et al. | ............... | 709/203 |
| 6,665,375 B1 * | 12/2003 | Forlenza et al. | ............... | 379/52 |
| 6,970,909 B2 * | 11/2005 | Schulzrinne | ................ | 709/206 |
| 7,120,692 B2 * | 10/2006 | Hesselink et al. | ............ | 709/225 |
| 7,251,254 B2 * | 7/2007 | Bond et al. | .................... | 370/467 |
| 7,293,271 B2 * | 11/2007 | Trossen et al. | ................ | 719/318 |
| 7,610,384 B1 * | 10/2009 | Schulzrinne et al. | ......... | 709/227 |
| 2002/0065814 A1 * | 5/2002 | Okamoto et al. | ................. | 707/3 |
| 2003/0191848 A1 * | 10/2003 | Hesselink et al. | ............ | 709/229 |
| 2004/0098483 A1 * | 5/2004 | Engel | ........................... | 709/227 |
| 2004/0230659 A1 * | 11/2004 | Chase | ........................... | 709/206 |
| 2005/0015499 A1 * | 1/2005 | Mayer | ........................... | 709/228 |
| 2005/0226225 A1 * | 10/2005 | Shigeta | ........................ | 370/352 |
| 2005/0256926 A1 * | 11/2005 | Muhonen et al. | ............. | 709/205 |
| 2006/0084454 A1 * | 4/2006 | Sung et al. | .................... | 455/518 |
| 2006/0106915 A1 * | 5/2006 | Fujisawa | ....................... | 709/208 |
| 2006/0123116 A1 * | 6/2006 | Rahman et al. | ............... | 709/227 |
| 2006/0135142 A1 * | 6/2006 | Repka | .......................... | 455/418 |
| 2006/0200658 A1 * | 9/2006 | Penkethman | ..................... | 713/2 |
| 2006/0253567 A1 * | 11/2006 | Selin et al. | .................... | 709/224 |
| 2007/0140157 A1 * | 6/2007 | Fu et al. | ........................ | 370/318 |
| 2008/0091773 A1 * | 4/2008 | Hameen-Anttila | ........... | 709/203 |
| 2008/0168165 A1 * | 7/2008 | Araki | ............................. | 709/223 |
| 2008/0298351 A1 * | 12/2008 | Buckley et al. | ............... | 370/355 |
| 2009/0119699 A1 * | 5/2009 | Crassous et al. | ............... | 725/25 |
| 2009/0290695 A1 * | 11/2009 | Schulzrinne et al. | ...... | 379/93.02 |
| 2010/0002690 A1 * | 1/2010 | Schulzrinne et al. | ......... | 370/352 |

FOREIGN PATENT DOCUMENTS

| | | |
|---|---|---|
| EP | 1 093 281 A2 | 4/2001 |
| WO | WO 2006/060375 A2 | 6/2006 |
| WO | WO 2007/026914 A1 | 3/2007 |

OTHER PUBLICATIONS

SIP (Rosenberg et al—RFC 3261—Jun. 2002).*
International Search Report and Written Opinion mailed Aug. 21, 2008 issued for corresponding international application No. PCT/IB2008/051344, 14 pages.

\* cited by examiner

*Primary Examiner* — Firmin Backer
*Assistant Examiner* — Michael A Chambers
(74) *Attorney, Agent, or Firm* — Sreenivas Vedantam; Moore & Van Allen PLLC

(57) ABSTRACT

A method may include issuing a Session Initiation Protocol (SIP) request to a Web feed server to receive a Web feed, and receiving from the Web feed server the Web feed.

25 Claims, 11 Drawing Sheets

WEB FEEDS OVER SIP

BACKGROUND

Given the technological advances in recent years, communication and information exchange has been redefined. With the development of multi-functional devices, coupled with anywhere, anytime connectivity, users are afforded an expansive platform to access information. In turn, our reliance on such devices has comparatively grown in both personal and business settings.

A multi-functional device may acquire various types of information by subscribing to one or more feeds, such as Web feeds. In this framework, the device may periodically or manually poll a Web server for an initial Web feed or for an update to the Web feed. Depending on the device, however, periodic or manual polling may occupy and/or deplete various device resources (e.g., processor or power). In this regard, particularly when a user subscribes to multiple Web feeds, the device resources may be unnecessarily utilized. Additionally, other resources associated with polling, such as connection resources between, for example, the device and a server, may also be unnecessarily utilized.

SUMMARY

According to one aspect, a method may include issuing a Session Initiation Protocol (SIP) request to a Web feed server to receive a Web feed, and receiving from the Web feed server the Web feed.

Additionally, the SIP request may include a subscribe message.

Additionally, the method may include determining whether the Web feed server may be SIP-enabled based on a response from the Web feed server.

Additionally, the method may include polling, by a client, to the Web feed server to receive the Web feed when it is determined that the Web feed server is not SIP-enabled, and where the polling may include issuing a Hypertext Transfer Protocol (HTTP) request.

Additionally, the HTTP request may include a get message.

Additionally, the Web feed may be received because of the HTTP request.

Additionally, the receiving of the Web feed may be based on the SIP request.

According to another aspect, a method may include issuing an HTTP request for a Web feed, intercepting the HTTP request, translating the HTTP request to a SIP request, issuing the SIP request for the Web feed to a Web feed server, and receiving the Web feed from the Web feed server.

Additionally, the HTTP request may include a get message and the SIP request may include a subscribe message.

Additionally, the method may include determining whether the Web feed server includes a SIP-enabled device based on an absence of a response from the Web feed server.

Additionally, the method may include issuing a second HTTP request to the Web feed server to receive the Web feed when it is determined that the Web feed server does not include a SIP-enabled device.

According to yet another aspect, a device may include a memory to store instructions, and a processor to execute the instructions. The processor may execute the instructions to issue a Service Location Protocol (SLP) query, issue a Session Initiation Protocol (SIP) request to a Web feed server that may cause the Web feed server to transmit a Web feed, and receive from the Web feed server the Web feed.

Additionally, the SIP request may include a subscribe message for the Web feed based on RSS.

Additionally, the processor may further execute instructions to determine whether the Web feed server may be SIP-enabled based on a response from the Web feed server.

Additionally, the processor may further execute instructions to issue a Hypertext Transfer Protocol (HTTP) request to the Web feed server to receive the Web feed when it is determined that the Web feed server is not SIP-enabled.

Additionally, the HTTP request may include a get message.

Additionally, the processor may further execute instructions to issue a HTTP request for the Web feed.

Additionally, the processor may further execute instructions to intercept the HTTP request, and translate the HTTP request to the SIP request.

According to still another aspect, a computer-readable medium device may contain instructions executable by at least one processor. The computer-readable medium device may include one or more instructions for issuing a SIP request for a Web feed to a Web feed server, one or more instructions for determining whether the Web feed server may be SIP-enabled based on a response from the Web feed server or an absence of a response from the Web feed server, and one or more instructions for receiving the Web feed from the Web feed server.

Additionally, the SIP request may include a subscribe message.

Additionally, the computer-readable medium device may include one or more instructions for issuing a HTTP request to the Web feed server to receive the Web feed when it is determined that the Web feed server is not SIP-enabled.

Additionally, the computer-readable medium device may include one or more instructions for issuing a HTTP request for the Web feed.

Additionally, the computer-readable medium device may include one or more instructions for intercepting the HTTP request, and one or more instructions for translating the HTTP request to the SIP request.

Additionally, the SIP request may include a subscribe message.

According to yet another aspect, a device may include means for issuing a SIP request for a Web feed, means for issuing a HTTP request for a Web feed, and means for receiving the Web feed based on at least one of the SIP request or the HTTP request.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention.

Overview

Figure 1:
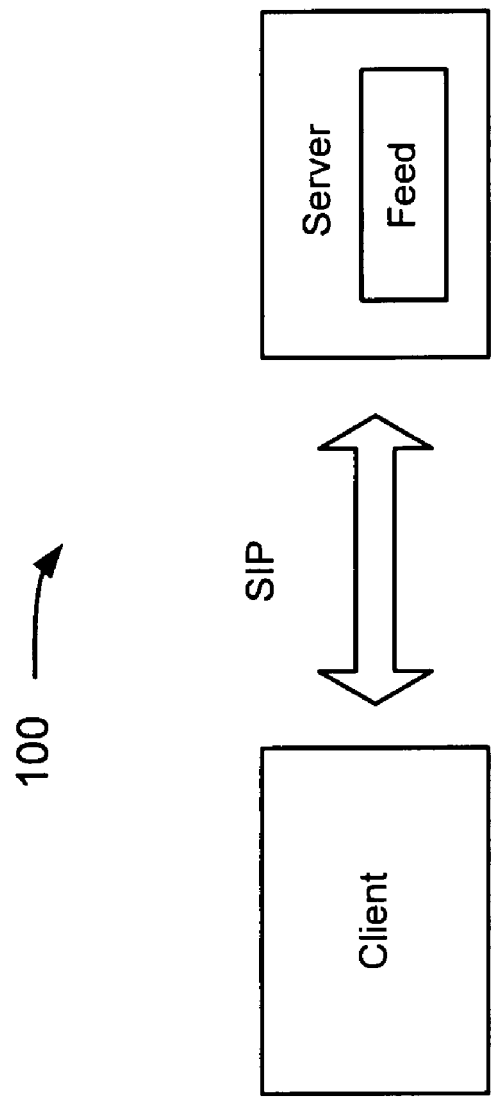
FIG. 1 is a diagram illustrating a concept described herein.

FIG. 1 is a diagram illustrating a concept as described herein. As illustrated, an environment 100 may include a client and a server. The server may provide a Web feed. For purposes of discussion, both the client and the server may use the Session Initiation Protocol (SIP) to set-up the feed.

In one implementation, the client may send a SIP request message, such as a SIP SUBSCRIBE message, to the server. In this way, the client may subscribe for an initial Web feed and an update to the Web feed when the update occurs. The server may send a SIP response message, such as a SIP NOTIFY message, to the client once the Web feed is available. The SIP NOTIFY message may contain the Web feed.

As will be described herein, numerous variations to FIG. 1 may be employed. For example, the client may be a non-SIP enabled client. Additionally, or alternatively, the server may be a non-SIP enabled server. Further, additional variations will be described below.

As a result of the foregoing, a user utilizing a device for receiving a Web feed from various content providers may not unnecessarily waste resources based on periodic or manual polling of a Web server. Additionally, as will be described herein, non-SIP enabled devices (e.g., client and/or server) may be adopted into this framework.

Exemplary Device

Figure 2:
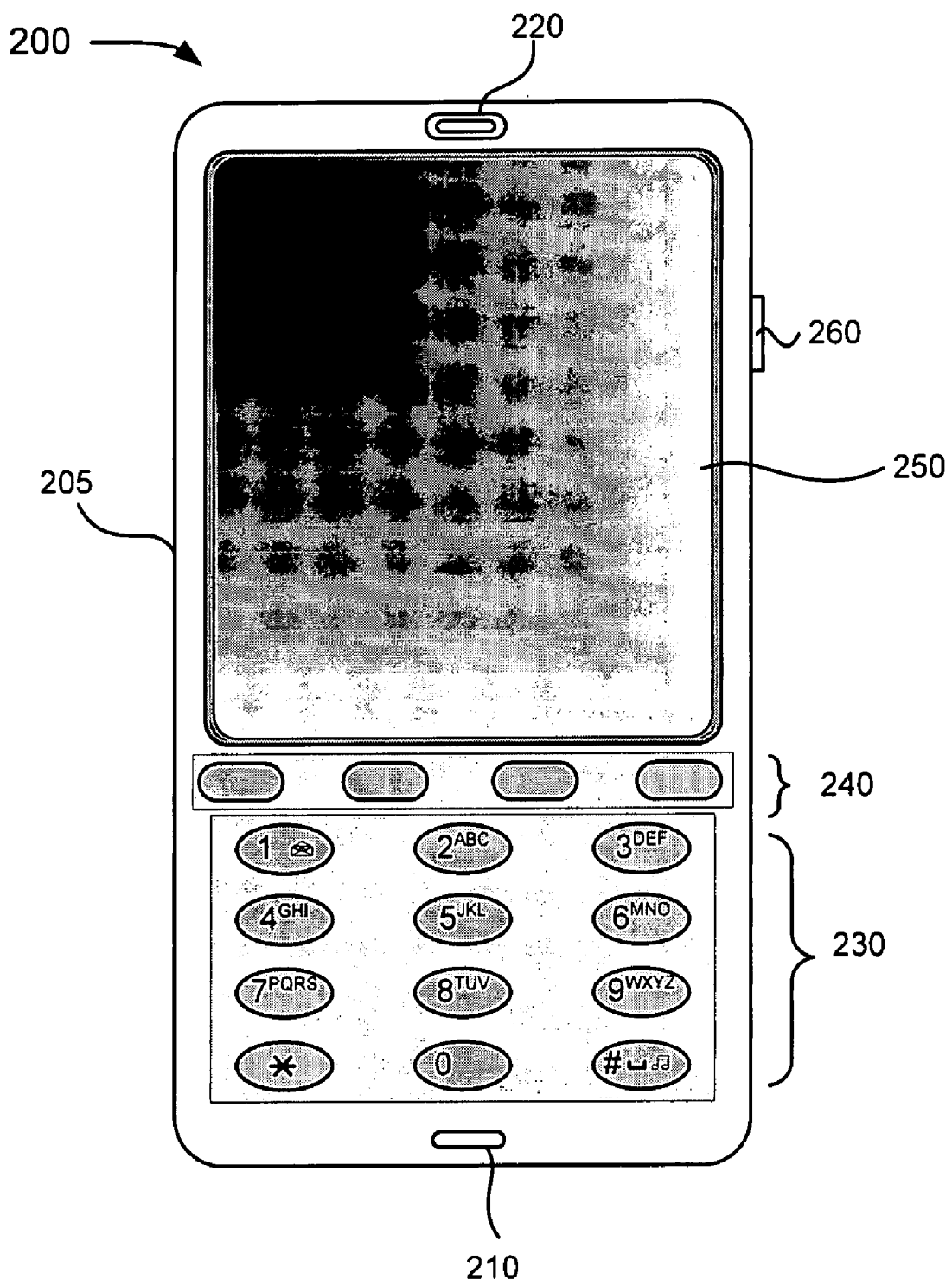
FIG. 2 is a diagram illustrating a front view of exemplary external components of an exemplary client device.

FIG. 2 is a diagram illustrating a front view of exemplary external components of an exemplary device. As illustrated, device 200 may include a housing 205, a microphone 210, a speaker 220, a keypad 230, function keys 240, a display 250, and a camera button 260. The term "component," as used herein, is intended to be broadly interpreted to include hardware, software, and/or a combination of hardware and software.

Housing 205 may include a structure configured to contain components of device 200. For example, housing 205 may be formed from plastic and may be configured to support microphone 210, speaker 220, keypad 230, function keys 240, display 250, and camera button 260.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound wave. For example, a user may listen to music through speaker 220.

Keypad 230 may include any component capable of providing input to device 200. Keypad 230 may include a standard telephone keypad. Keypad 230 may also include one or more special purpose keys. In one implementation, each key of keypad 230 may be, for example, a pushbutton. A user may utilize keypad 230 for entering information, such as text or a phone number, or activating a special function.

Function keys 240 may include any component capable of providing input to device 200. Function keys 240 may include a key that permits a user to cause device 200 to perform one or more operations. The functionality associated with a key of function keys 240 may change depending on the mode of device 200. For example, function keys 240 may perform a variety of operations, such as placing a telephone call, playing various media, setting various camera features (e.g., focus, zoom, etc.) or accessing an application. Function keys 240 may include a key that provides a cursor function and a select function. In one implementation, each key of function keys 240 may be, for example, a pushbutton.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may display, for example, text, image, and/or video information. Display 250 may also operate as a view finder. Camera button 260 may be a pushbutton that enables a user to take an image.

Device 200 is intended to be broadly interpreted to include any type of communication device. For example, device 200 may include a handheld device, such as a wireless telephone, a personal digital assistant (PDA), or a computer. In other instances, device 200 may include a stationary device, such as a telephone (e.g., an Internet Protocol (IP) phone) or a computer, or another type of communication device. Accordingly, although FIG. 2 illustrates exemplary external components of device 200, in other implementations, device 200 may contain fewer, different, or additional external components than the external components depicted in FIG. 2. Additionally, or alternatively, one or more external components of device 200 may include the capabilities of one or more other external components of device 200. For example, display 250 may be an input component (e.g., a touch screen). Additionally, or alternatively, the external components may be arranged differently than the external components depicted in FIG. 2.

Figure 3:
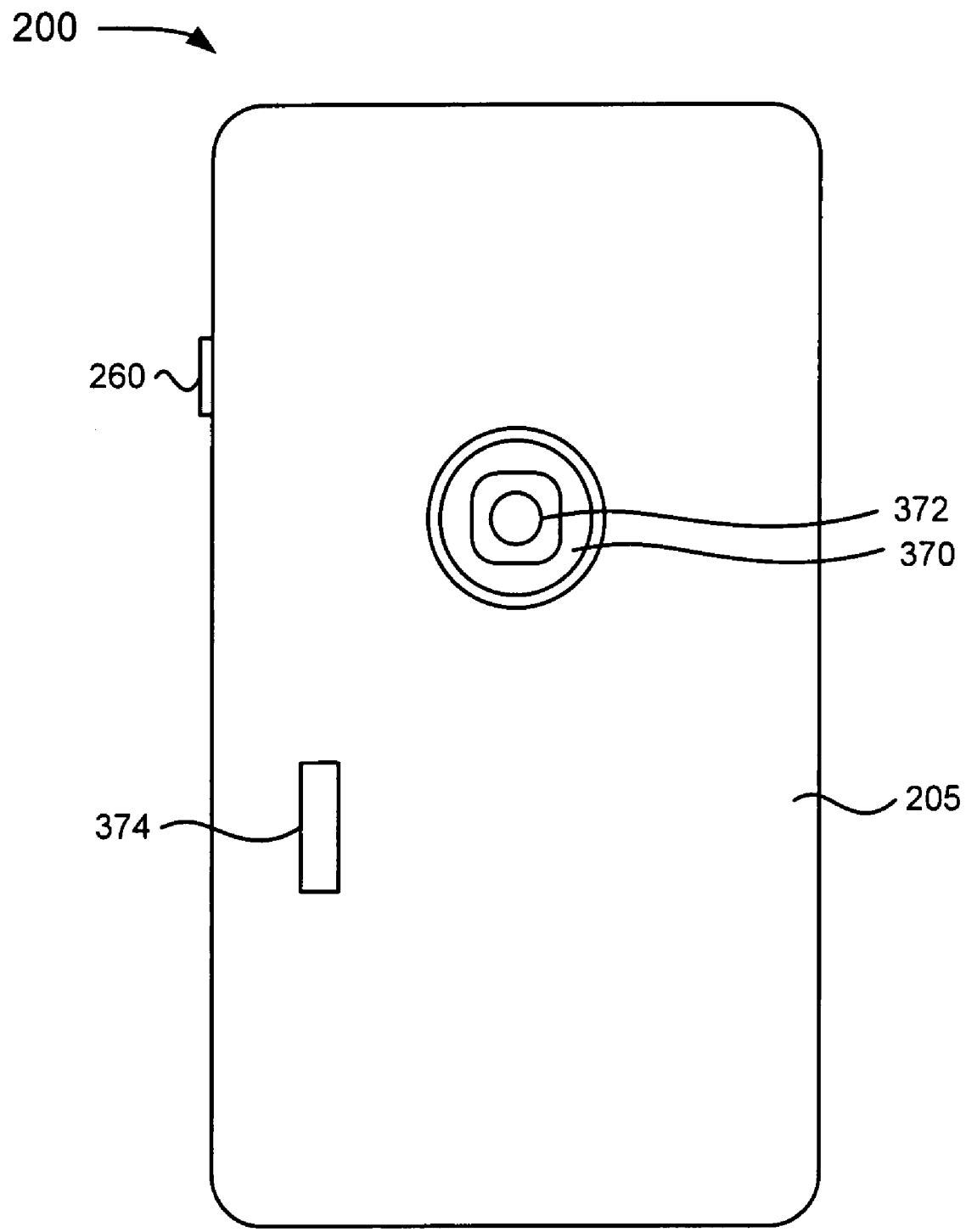
FIG. 3 is a diagram illustrating a rear view of exemplary external components of the device depicted in FIG. 2.

FIG. 3 is a diagram illustrating a rear view of exemplary external components of the device depicted in FIG. 2. As illustrated, in addition to the components previously described, device 200 may include a camera 370, a lens assembly 372, and a flash 374.

Camera 370 may include any component capable of capturing an image. Camera 370 may be a digital camera. Display 250 may operate as a view finder when a user of device 200 operates camera 370. Camera 370 may provide for automatic and/or manual adjustment of a camera setting. In one implementation, device 200 may include camera software that is displayable on display 250 to allow a user to adjust a camera setting. For example, a user may be able adjust a camera setting by operating function keys 240.

Lens assembly 372 may include any component capable of manipulating light so that an image may be captured. Lens assembly 372 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. In one implementation, lens assembly 372 may be permanently fixed to camera 370. Lens assembly 372 may provide for a variable aperture size (e.g., adjustable f-number).

Flash 374 may include any type of light-emitting component to provide illumination when camera 370 captures an image. For example, flash 374 may be a light-emitting diode (LED) flash (e.g., white LED) or a xenon flash.

Although FIG. 3 illustrates exemplary external components, in other implementations, device 200 may include fewer, additional, and/or different components than the exemplary external components depicted in FIG. 3. For example, device 200 may not include camera 370 and other components associated therewith. In still other implementations, one or more external components of device 200 may be arranged differently.

Figure 4:
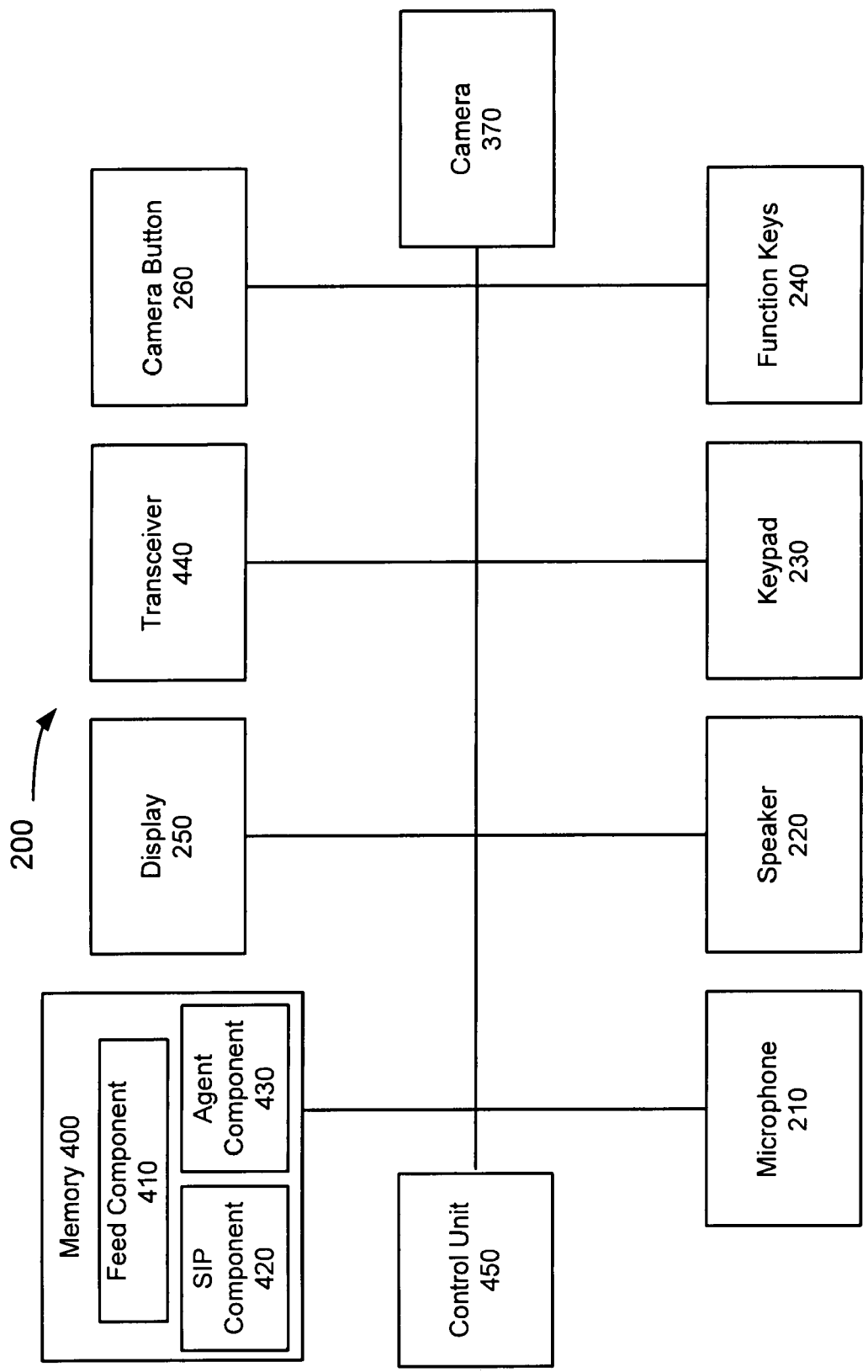
FIG. 4 is a diagram illustrating exemplary internal components of the device depicted in FIG. 2.

FIG. 4 is a diagram illustrating exemplary internal components of the device depicted in FIG. 2. As illustrated, device 200 may include microphone 210, speaker 220, keypad 230, function keys 240, display 250, camera button 260, camera 370, a memory 400, a transceiver 440, and a control unit 450. No further description of microphone 210, speaker 220, keypad 230, function keys 240, display 250, camera button 260, and camera 370 is provided with respect to FIG. 4.

Memory 400 may include any type of storing component to store data and instructions related to the operation and use of device 200. For example, memory 400 may include a memory component, such as a random access memory (RAM), dynamic random access memory (DRAM), static random access memory (SRAM), synchronous dynamic random access memory (SRAM), ferroelectric random access memory, (FRAM), a read only memory (ROM), a programmable read only memory (PROM), an erasable programmable read only memory (EPROM), electrically erasable read only memory (EEPROM), and/or flash memory. Additionally, memory 400 may include a storage component, such as a magnetic storage component (e.g., a hard drive), a compact disc (CD) drive, a digital versatile disc (DVD) drive, or another type of computer-readable medium. Memory 400 may also include an external storing component, such as a Universal Serial Bus (USB) memory stick, a digital camera memory card, and/or a Subscriber Identity Module (SIM) card.

Memory 400 may include a feed component 410. For example, feed component 410 may include application software having a Really Simple Syndication (RSS) client or an Atom client. In one implementation, feed component 410 may include a Personal Information Manager (PIM) application that handles one or more RSS and/or Atom Web feeds. Memory 400 may also include a SIP component 420. SIP component 420 may include a protocol stack of the SIP. SIP component 420 may permit device 200 to receive RSS and/or Atom Web feeds from another device, such as a Web server, using the SIP.

The SIP component 420 may include other protocol stacks, such as the service location protocol (SLP), as well as a SLP agent (not illustrated). The SLP and the SLP agent may allow device 200 to find services in a network, such as a SIP-enabled Web feed server.

In another implementation, memory 400 may not include SIP component 420. Rather, memory 400 may include an agent component 430. For example, in instances when device 200 may not include a SIP-enabled component, agent component 430 may be added to device 200 instead of re-writing one or more RSS and/or Atom clients of feed component 410. Agent component 430 may provide an interface for feed component 410 to receive Web feeds via the SIP. For example, agent component 430 may include a Hypertext Transfer Protocol (HTTP) proxy. As will be described herein, agent component 430 may, for example, intercept a Web feed request from feed component 410, such as from a RSS or an Atom client, and translate the Web feed request to conform to the SIP. Additionally, agent component 430 may, for example, intercept SIP communications from the Web server and provide a Web feed to feed component 410. That is, agent component 430 may issue and receive SIP messages to and from, for example, feed component 410 and the Web server. Agent component 430 may also issue an HTTP request to the Web server when the Web server rejects a SIP request and/or when the Web server does not respond to a SIP request.

Transceiver 440 may include any component capable of transmitting and receiving information. For example, transceiver 440 may include a radio circuit that provides wireless communication with a network or another device.

Control unit 450 may include any logic that may interpret and execute instructions, and may control the overall operation of device 200. Logic, as used herein, may include hardware, software, and/or a combination of hardware and software. Control unit 450 may include, for example, a general-purpose processor, a microprocessor, a data processor, a co-processor, and/or a network processor. Control unit 450 may access instructions from memory 400, from other components of device 200, and/or from a source external to device 200 (e.g., a network or another device).

Control unit 450 may provide for different operational modes associated with device 200. Additionally, control unit 450 may operate in multiple modes simultaneously. For example, control unit 450 may operate in a camera mode, a walkman mode, and/or a telephone mode.

Device 200 may perform certain operations relating to feed component 410, SIP component 420, and agent component 430. Device 200 may perform these operations in response to control unit 450 executing software instructions contained in a computer-readable medium, such as memory 400. A computer-readable medium may be defined as a physical or logical memory device. The software instructions may be read into memory 400 and may cause control unit 450 to perform processes associated with feed component 410, SIP component 420, and agent component 430. Alternatively, hardwired circuitry may be used in place of or in combination with software instructions to implement processes described herein. Thus, implementations described herein are not limited to any specific combination of hardware circuitry and software.

Although FIG. 4 illustrates exemplary internal components, in other implementations, device 200 may include fewer, additional, and/or different components than the exemplary internal components depicted in FIG. 4. In still other implementations, one or more internal components of device 200 may include the capabilities of one or more other components of device 200. For example, transceiver 440 and/or control unit 450 may include their own on-board memory 400.

FIG. 5-FIG. 8 are diagrams illustrating exemplary environments employing the SIP to receive a Web feed. Before describing FIG. 5-FIG. 8, it should be noted that additional operations may be employed not specifically illustrated. For example, different SIP registration methods may be employed based on, for example, Request for Comments (RFC) 2617 and RFC 3310. In one implementation, device 200 (e.g., feed component 410 and/or agent component 430) may register with a SIP-enabled Web server, which may or may not include an authentication scheme. For SIP-enabled RSS feeds, the SIP-enabled Web server may register a SIP-address with a feed source. However, in other implementations, there may be support for non-SIP enabled RSS feeds. For example, the SIP-enabled Web server may act as a proxy to a list of non-SIP enabled RSS feeds in order to translate between the pull behavior of a non-RSS feed and the push behavior of SIP-enabled RSS feed.

Figure 5:
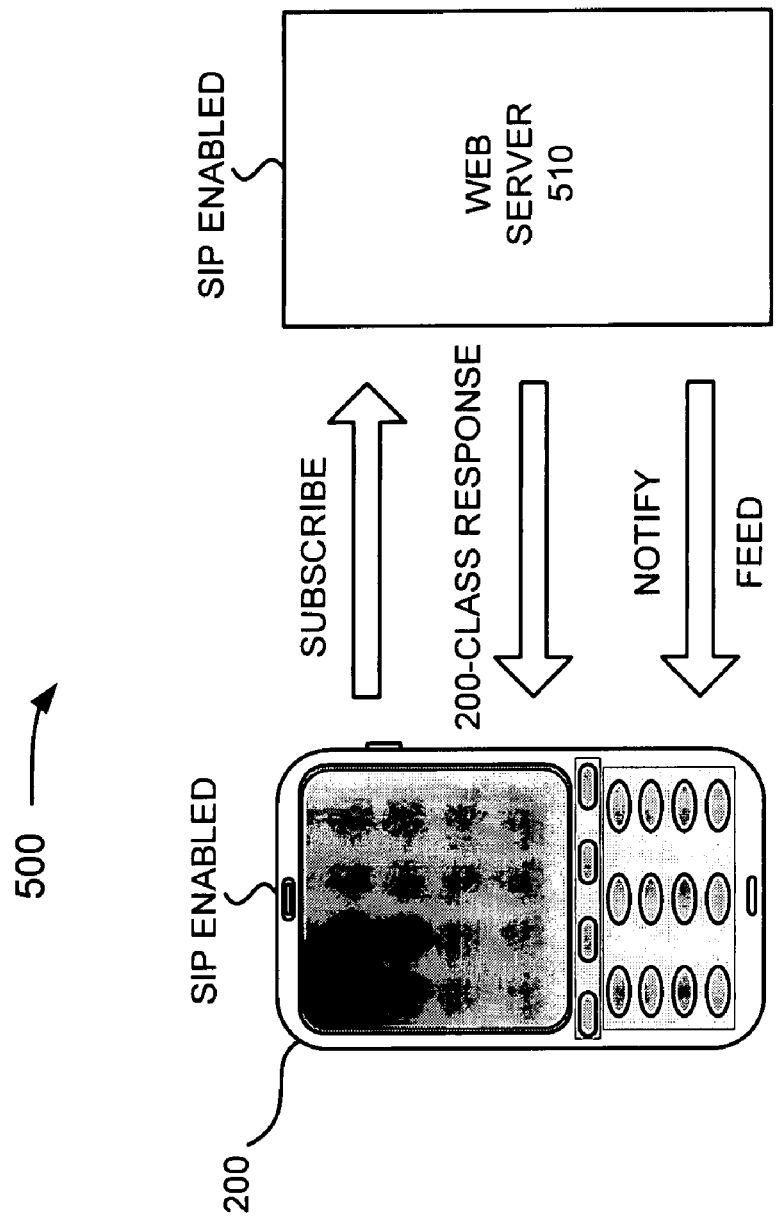
FIG. 5-FIG. 8 are diagrams illustrating exemplary environments employing the Session Initiation Protocol to receive a Web feed.

FIG. 5 is a diagram illustrating a first exemplary environment employing the SIP to receive a Web feed. As illustrated, exemplary environment 500 may include device 200 and a Web server 510. Both device 200 and Web server 510 may be SIP-enabled. Web server 510 may publish a Web feed based on, for example, RSS and/or Atom.

In one implementation, device 200 may issue a SIP request, such as a SUBSCRIBE message, to Web server 510. The SUBSCRIBE message may include, for example, among other things, a FROM header, a TO header, and/or a Request-URI (Uniform Resource Identifier). The Request-URI may contain information to route the SIP request to the appropriate entity, such as Web server 510.

The SUBSCRIBE message may be interpreted by Web server 510 as a subscription for an initial Web feed and an update to the Web feed when the update occurs. For example, Web server 510 may refer to an EVENT header in the SUBSCRIBE message that may indicate which event or class of events device 200 may be subscribing. Web server 510 may issue an acknowledgement to the subscription in the form of a 200-class response. Web server 510 may issue a NOTIFY message to device 200 based on the SUBSCRIBE message. Web server 510 may provide a Web feed to device 200 with the NOTIFY message.

Although FIG. 5 illustrates an exemplary environment employing the SIP to receive a Web feed, in other implementations, fewer, different, or additional components than the exemplary components depicted in FIG. 5 may be utilized. Additionally, or alternatively, depending on state information of the environment, fewer, different, or additional operations may be performed. For example, fewer, different, or additional messages may be exchanged.

Figure 6:
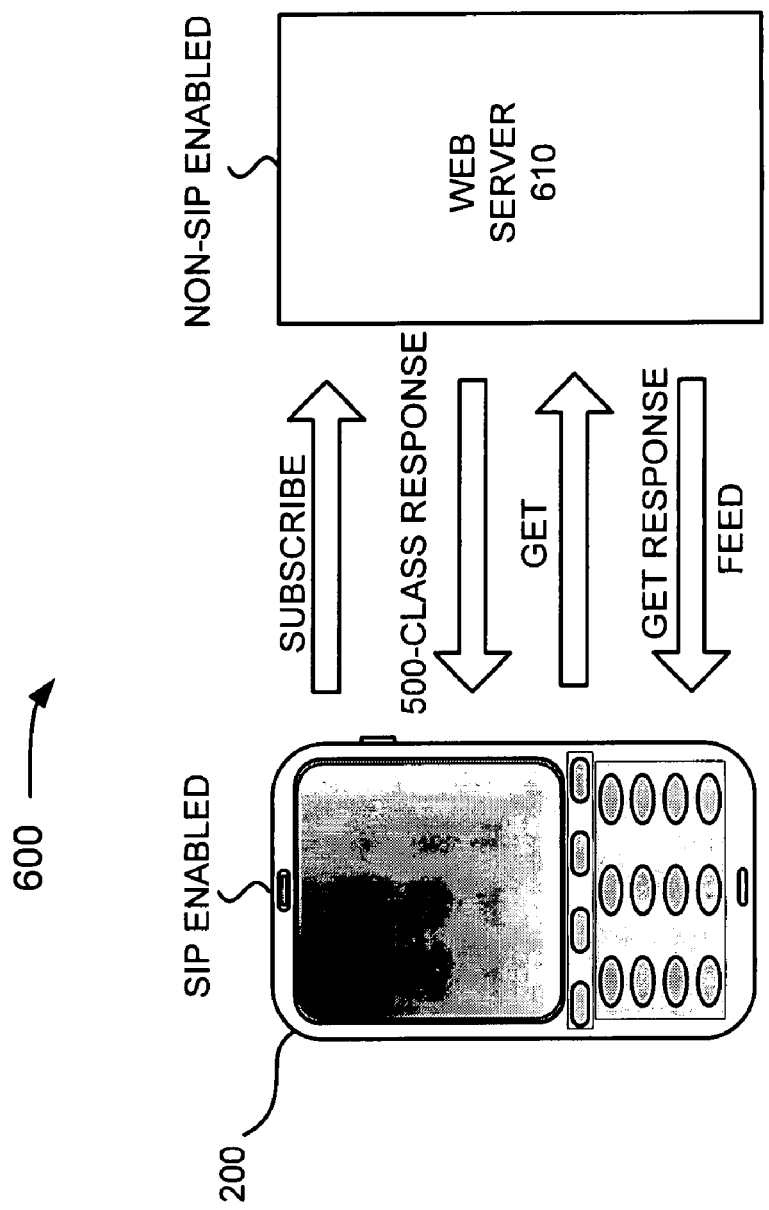

FIG. 6 is a diagram illustrating a second exemplary environment employing the SIP and HTTP to receive a Web feed. As illustrated, exemplary environment 600 may include device 200 and a Web server 610. Device 200 may be a SIP-enabled device and Web server 610 may not be SIP-enabled. For purposes of discussion, the term "non-SIP enabled," may include not only a device that does not include SIP support, but also a device that may support some SIP. For example, a device may not support all SIP request methods (e.g., SUBSCRIBE/NOTIFY method). Additionally, or alternatively, a device may not support all versions of the SIP. Web server 610 may publish a Web feed based on, for example, RSS and/or Atom.

In one implementation, device 200 may issue a SUBSCRIBE message to Web server 610. Since Web server 610 may be a non-SIP enabled device, Web server 610 may issue (as illustrated), for example, a 500-class response to indicate a server failure (e.g., when Web server 610 supports some of the SIP). Alternatively, for example, Web server 610 may not issue any response or acknowledgement message (e.g., when Web server 610 does not support the SIP at all).

In either instance, for example, device 200 may resort to polling Web server 610. For example, device 200 may issue an HTTP request message, such as a GET message, to Web server 610. Web server 610 may provide a Web feed to device 200 based on the GET message.

Although FIG. 6 illustrates an exemplary environment employing the SIP to receive a Web feed, in other implementations, fewer, different, or additional components than the exemplary components depicted in FIG. 6 may be utilized. Additionally, or alternatively, depending on state information of the environment, fewer, different, or additional operations may be performed. For example, fewer, different, or additional messages may be exchanged.

Figure 7:
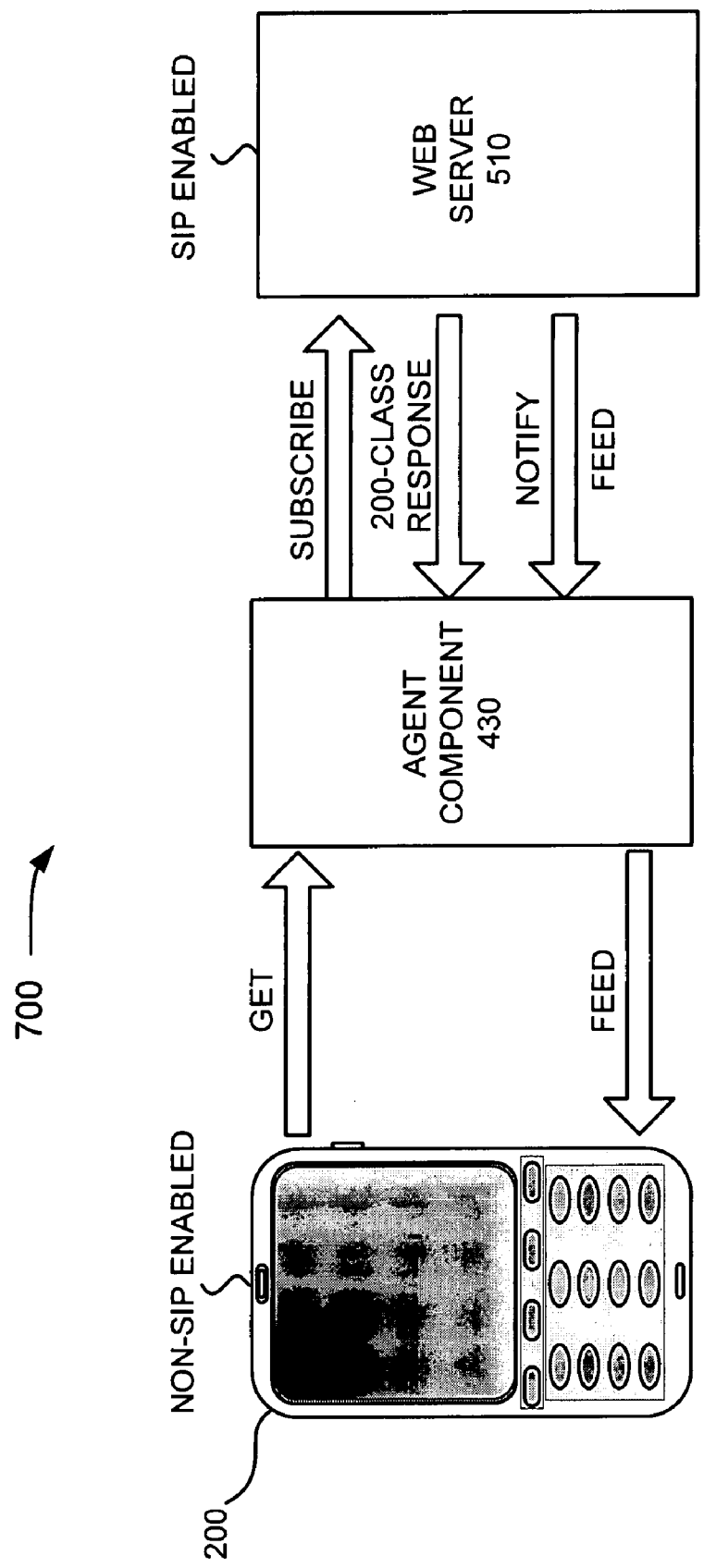

FIG. 7 is a diagram illustrating a third exemplary environment employing the SIP to receive a Web feed. As illustrated, exemplary environment 600 may include device 200 and Web server 510. Device 200 may be a non-SIP enabled device that includes agent component 430. Web server 510 may be a SIP-enabled device.

In one implementation, feed component 410 may issue an HTTP request, such as a GET message. Agent component 430 may intercept the GET message and translate the GET message to a SUBSCRIBE message corresponding to the SIP. The SUBSCRIBE message may be sent to Web server 510. The SUBSCRIBE message may be interpreted by Web server 510 as a subscription to a Web feed. Web server 510 may issue an acknowledgement to the subscription in the form of a 200-class response. Web server 510 may issue a NOTIFY message to device 200. Web server 510 may provide a Web feed update to device 200 with the NOTIFY message.

Although FIG. 7 illustrates an exemplary environment employing the SIP to receive a Web feed, in other implementations, fewer, different, or additional components than the exemplary components depicted in FIG. 7 may be utilized. Additionally, or alternatively, depending on state information of the environment, fewer, different, or additional operations may be performed. For example, fewer, different, or additional messages may be exchanged.

Figure 8:
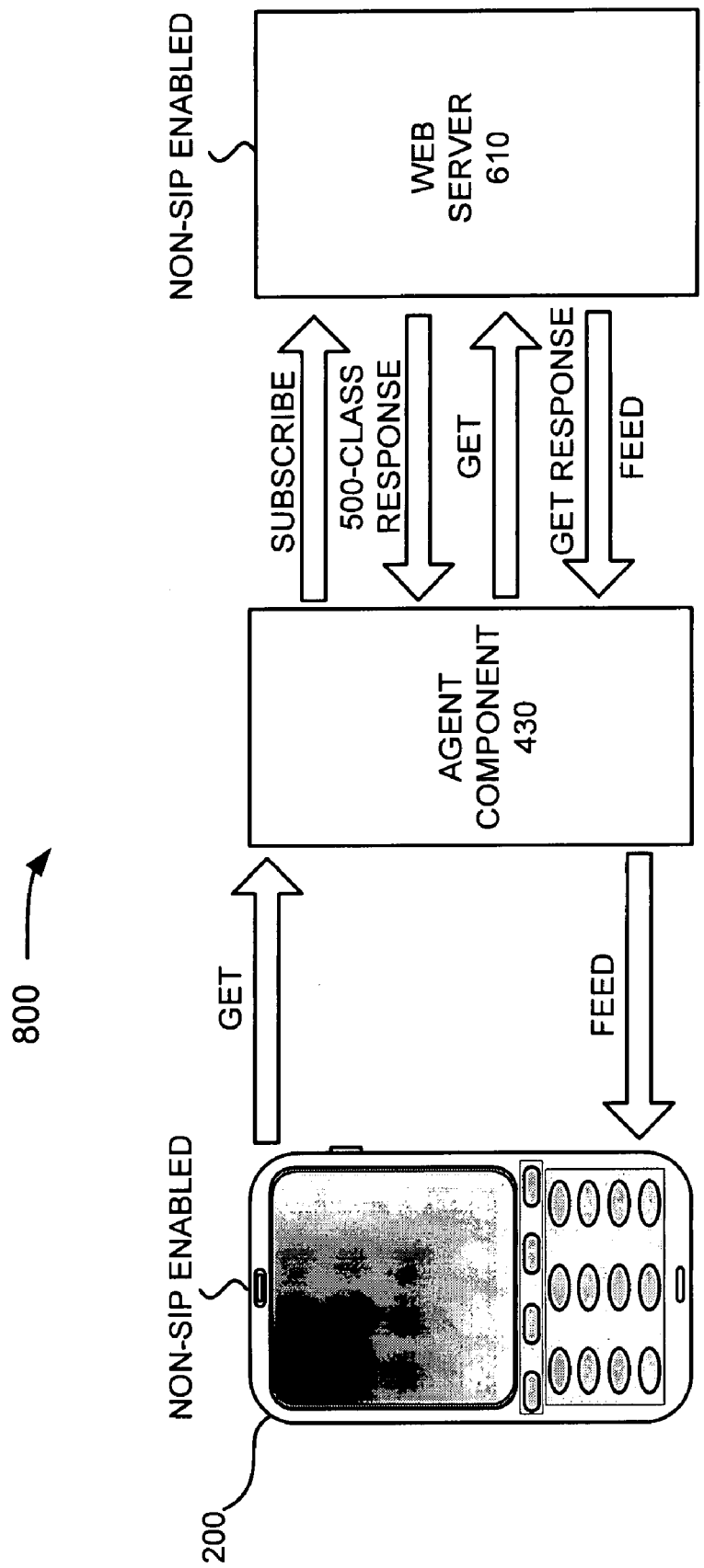

FIG. 8 is a diagram illustrating a fourth exemplary environment employing the SIP to receive a Web feed. As illustrated, exemplary environment 600 may include device 200 and Web server 610. Device 200 may be a non-SIP enabled device that includes agent component 430. Web server 610 may be a non-SIP enabled device.

In one implementation, feed component 410 may issue an HTTP request, such as a GET message. Agent component 430 may intercept the GET message and translate the GET message to a SUBSCRIBE message corresponding to the SIP. The SUBSCRIBE message may be sent to Web server 610. Since Web server 610 may be a non-SIP enabled device, Web server 610 may issue (as illustrated), for example, a 500 class SIP response (e.g., when Web server 610 supports some SIP). Alternatively, for example, Web server 610 may not issue any response or acknowledgement message (e.g., when Web server 610 does not support any of the SIP).

In either instance, for example, agent component 430 may resort to polling Web server 610. For example, agent component 430 may issue an HTTP request message, such as a GET message, to Web server 610. Web server 610 may provide a Web feed to device 200 based on the GET message.

Although FIG. 8 illustrates an exemplary environment employing the SIP to receive a Web feed, in other implementations, fewer, different, or additional components than the exemplary components depicted in FIG. 8 may be utilized. Additionally, or alternatively, depending on state information of the environment, fewer, different, or additional operations may be performed. For example, fewer, different, or additional messages may be exchanged.

Figure 9:
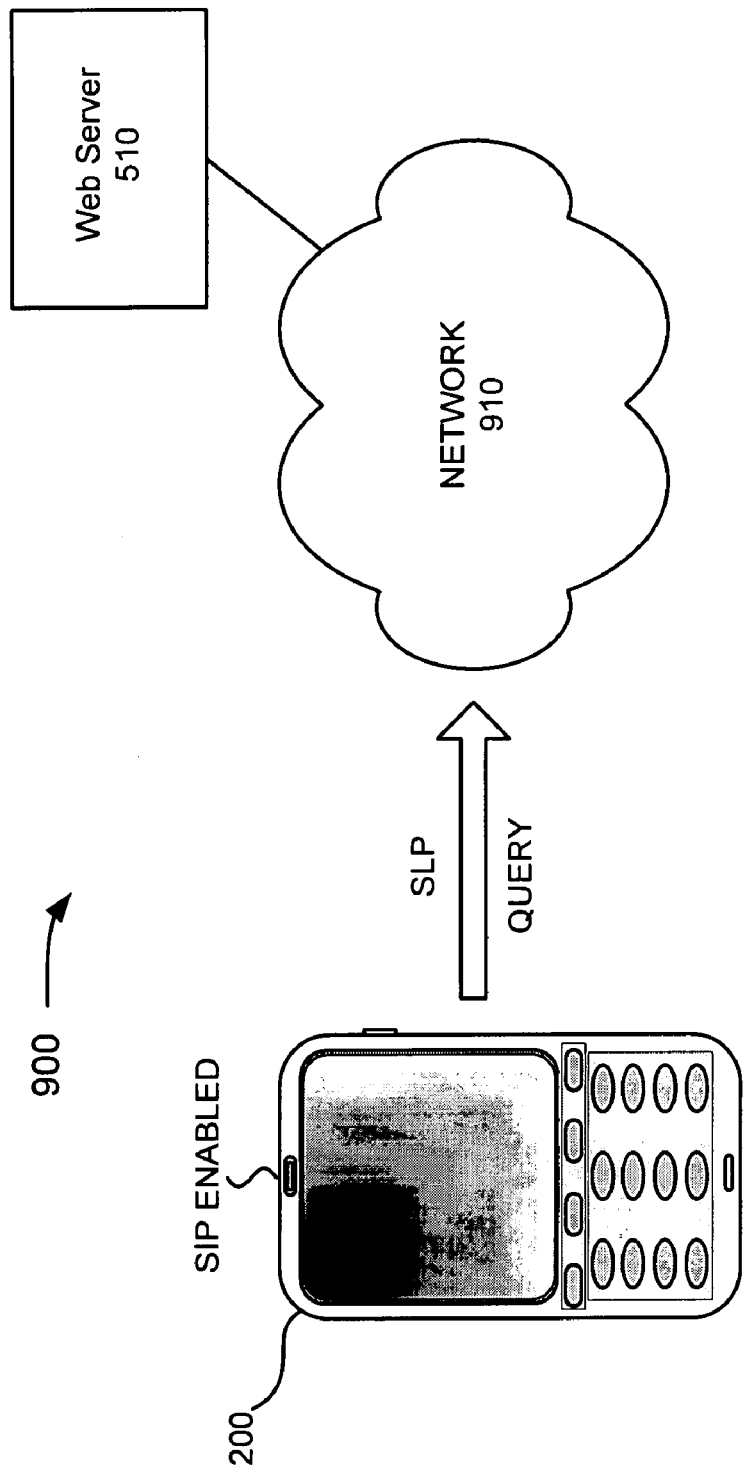
FIG. 9 is a diagram illustrating exemplary operations for discovery of the Web server depicted in FIG. 5.

FIG. 9 is a diagram illustrating exemplary operations for discovery of the Web server depicted in FIG. 5. As illustrated, an environment 900 may include SIP-enabled device 200, Web server 510, and network 910. In this scenario, SIP-enabled device 200 may wish to discover a SIP-enabled Web server, such as Web server 510, within network 910 based on the SLP. That is, the SLP may allow device 200 to discover Web feed services from a SIP-enabled Web server. For example, device 200 may transmit a QUERY message to network 910. In one implementation, device 200 may transmit a QUERY message to a Directory Agent (DA). Additionally, or alternatively, device 200 may use multicast convergence when device 200 does not know of a DA. In this example, since network 910 includes Web server 510 (i.e., a SIP enabled Web feed server), acknowledgements, registrations, and/or SIP-enabled Web feed services may be received by device 200.

Additionally, or alternatively, SIP-enabled device 200 may issue a SUBSCRIBE message to a Web server, such as Web server 510, to determine whether the Web server supports SIP for feed purposes.

Although FIG. 9 illustrates an exemplary environment employing the SIP to receive a Web feed, in other implementations, different, or additional devices than the exemplary devices depicted in FIG. 9 may be utilized. Additionally, or alternatively, depending on state information of the environment, fewer, different, or additional operations may be performed. For example, fewer, different, or additional messages may be exchanged.

Figure 10:
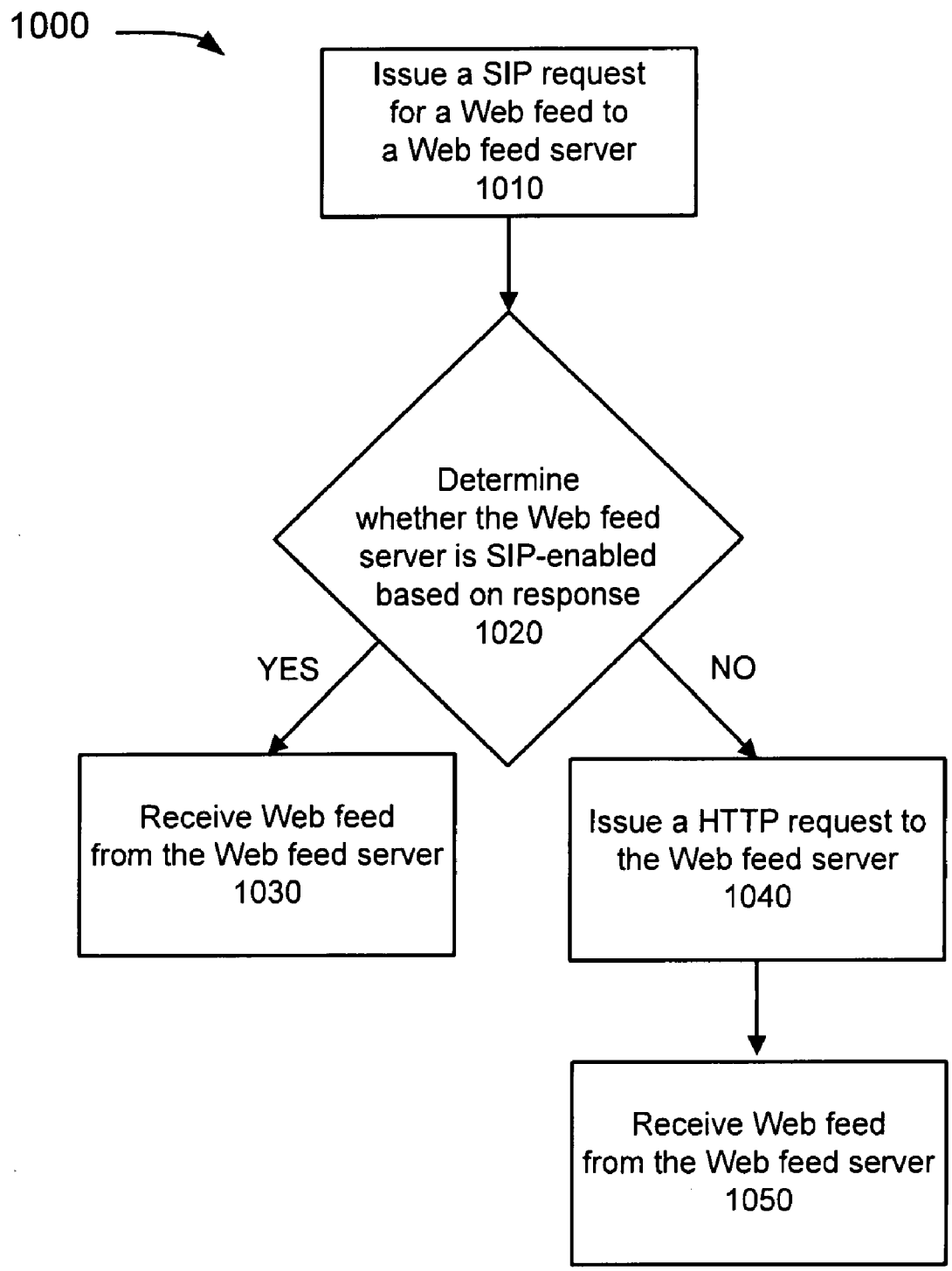
FIG. 10 is a flow diagram illustrating exemplary operations related to the SIP-enabled device depicted in FIGS. 5 and 6.

FIG. 10 is a flow diagram illustrating exemplary operations related to the SIP-enabled device 200 depicted in FIGS. 5 and 6. Process 1000 may begin with a device, such as device 200, issuing a SIP request to a Web feed server (Block 1010). For example, device 200 may issue a SUBSCRIBE message to a Web server requesting a Web feed. In one implementation, SIP component may issue the SUBSCRIBE message. In Block 1020, a determination may be made as to whether the Web server is SIP-enabled based on the Web server's response. For example, device 200 may determine that the Web server is SIP-enabled based on receiving a 200-class SIP response (i.e., a response that indicates success). A 200-class SIP response may indicate, for example, OK (e.g., a 200-SIP response) or accepted (e.g., a 202-SIP response). In other instances, device 200 may determine that the Web server is not a SIP-enabled device based on, for example, receiving a 500-class SIP response (i.e., a response that indicates a server failure). A 500-class SIP response may indicate, for example, that the SIP request is not implemented (e.g., a 501-SIP response), that service is unavailable (e.g., a 503-SIP response), or that the Web server does not support this version of the SIP (e.g., a 505-SIP response). Alternatively, device 200 may determine that the Web server is not a SIP-enabled device by not receiving any response message from the Web server. In one implementation SIP component 420 may determine whether the Web server is a SIP-enabled device.

Based on the above, if device 200 determines that the Web feed server is SIP-enabled (Block 1020—YES), then device 200 may receive the Web feed from the Web feed server (Block 1030). However, if device 200 determines that the Web feed server is not SIP-enabled (Block 1020—NO), then device 200 may issue a HTTP request to the Web feed server (Block 1040). For example, device 200 may issue a GET message to the Web feed server. In one implementation, feed component 410 may issue the GET message. In Block 1050, device 200 may receive the Web feed from the Web feed server.

Although FIG. 10 illustrates an exemplary operations, in other implementations, fewer, different, or additional operations than those depicted in FIG. 10 may be employed. For example, depending on state information of the environment, fewer, different, or additional messages may be exchanged.

Figure 11:
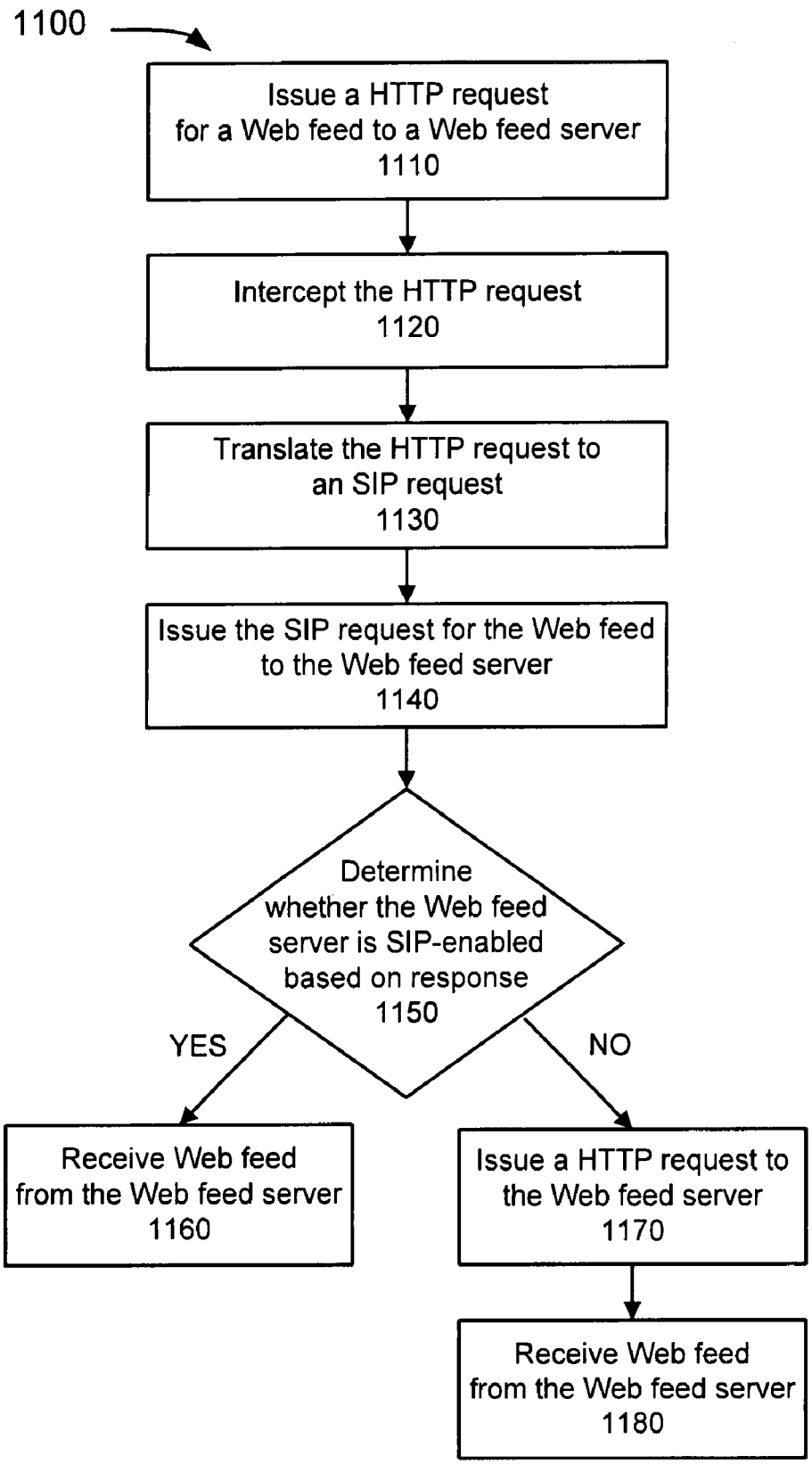
FIG. 11 is a flow diagram illustrating exemplary operations related to the non-SIP enabled device depicted in FIGS. 8 and 9.

FIG. 11 is a flow diagram illustrating exemplary operations related to the non-SIP enabled device 200 depicted in FIGS. 8 and 9. Process 1100 may begin with a device, such as device 200, issuing an HTTP request to a Web feed server (Block 1110). For example, device 200 may issue a GET message to the Web feed server. In one implementation, feed component 410 may issue the GET message. The HTTP request may be intercepted (Block 1120). For example, agent component 430 of device 200 may intercept the HTTP request, such as the GET message. Device 200 may translate the HTTP request to a SIP request (Block 1130). For example, agent component 430 may intercept the GET message and translate the GET message to a SUBSCRIBE message.

The operations in Blocks 1140 through 1180 may be performed in a similar manner to that previously described with respect to Blocks 1010 through Block 1050 of FIG. 10.

Although FIG. 11 illustrates an exemplary operations, in other implementations, fewer, different, or additional operations than those depicted in FIG. 11 may be employed. For example, depending on state information of the environment, fewer, different, or additional messages may be exchanged.

CONCLUSION

The foregoing description of implementations provides illustration, but is not intended to be exhaustive or to limit the implementations to the precise form disclosed. Modifications and variations are possible in light of the above teachings or may be acquired from practice of the teachings. For example, the concepts described herein may be applied to other situations where polling may be utilized. For example, typically a device may retrieve e-mail from an e-mail server based on polling. This polling approach may be unnecessary based on the concepts described herein. For example, an SIP-enabled device may issue a SUBSCRIBE message to an SIP-enabled e-mail server instead of polling. Thus, a device may be notified when new e-mail arrives. Similarly, depending on the capabilities of the device and the e-mail server (i.e., SIP-enabled or non-SIP enabled), other processes may be employed in accordance with this description.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of processes has been described herein, the order of the processes may be modified in other implementations. Further, non-dependent processes may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method comprising:
   determining whether a client is SIP (Session Initiation Protocol) enabled;
   determining a type of request to issue from the client to a Web feed server, the type of request being based on whether the client is SIP enabled;
   in response to determining the client is SIP enabled, issuing, by the client and to the Web feed server, a SIP request to subscribe to a Web feed;
   in response to receiving, by the client and from the Web feed server, a response to the SIP request, determining, by the client, that the Web feed server is not compatible with the SIP request where the response indicates that the Web feed server does not support the SIP request method;
   in response to determining that the Web feed server is not compatible with the SIP request, polling, by the client, the Web feed server to receive the Web feed from the Web feed server, where polling the Web feed server includes sending, to the Web feed server, a Hypertext Transfer Protocol (HTTP) request based on the SIP request; and
   receiving, by the client and in response to polling the Web feed server, the Web feed from the Web feed server.

2. The method of claim 1, where the SIP request includes a subscribe message.

3. The method of claim 1, where determining that the Web feed server is not compatible with the SIP request includes:
   determining that the response, from the Web server, does not include a 200 class SIP response.

4. The method of claim 1, where determining that the Web feed server is not compatible with the SIP request includes:
   determining that the response from the Web feed server includes a 500 class SIP response.

5. The method of claim 1, where the HTTP request includes a get message.

6. The method of claim 1, where the client comprises a handheld device.

7. A method comprising:
   determining whether a client is SIP (Session Initiation Protocol) enabled;
   determining a type of request to issue from the client to a Web feed server, the type of request being based on whether the client is SIP enabled;
   in response to determining the client is not SIP enabled, issuing, by the client, a first Hypertext Transfer Protocol (HTTP) request for a Web feed;
   intercepting, by the client, the first HTTP request;
   translating, by the client, the first HTTP request to a SIP request for the Web feed;
   issuing, by the client, the SIP request to the Web feed server;
   determining, by the client, that the Web feed server is not compatible with the SIP request in response to receiving a message from the Web feed server indicating that the Web feed server does not support the SIP request method;
   automatically issuing, by the client to the Web feed server and in response to determining that the Web feed server is not compatible with the SIP request, a second HTTP request to receive the Web feed from the Web feed server, wherein the second HTTP request is not translated to a SIP request; and
   receiving, by the client, at least a portion of the Web feed from the Web feed server in response to the second HTTP request.

8. The method of claim 7, where the first HTTP request includes a get message and the SIP request includes a subscribe message.

9. The method of claim 7, where the client comprises a handheld device.

10. The method of claim 7, where determining that the Web feed server is not compatible with the SIP request further includes:
    determining that the response, from the Web feed server, includes a 500 class SIP response.

11. A device, comprising:
    a memory to store instructions; and
    a processor to execute the instructions to:
       determine whether the device is SIP (Session Initiation Protocol) enabled;
       determine a type of request to issue from the device to a Web feed server, the type of request being based on whether the device is SIP enabled;
       in response to determining the device is SIP enabled, issue a SIP request to the Web feed server to request a Web feed associated with the Web feed server;
       determine that the Web feed server is not compatible with the SIP request in response to receiving a message from the Web feed server indicating that the Web feed server does not support the SIP request method;
       poll the Web feed server to receive the Web feed in response to determining that the Web feed server is not compatible with the SIP request, where the processor, when polling the Web feed server, further sends, to the Web feed server, a Hypertext Transfer Protocol (HTTP) request based on the SIP request; and
       receive, from the Web feed server, the Web feed in response to sending the HTTP request.

12. The device of claim 11, where the SIP request includes a subscribe message for the Web feed based on Really Simple Syndication (RSS).

13. The device of claim 11, where the device includes a wireless telephone.

14. The device of claim 11, where the device is a handheld device.

15. The device of claim 11, where the HTTP request includes a get message.

16. The device of claim 11, where the processor, when determining that the Web feed server is not compatible with the SIP request, further executes instructions to:
    determine that the response, from the Web feed server to the SIP request, includes a 500 class SIP response.

17. The device of claim 11, where the processor, when determining that the Web feed server is not compatible with the SIP request, further executes instructions to:
    determine the response, from the Web feed server, does not include a 200 class SIP response.

18. A memory device containing instructions executable by at least one processor, the memory device comprising:
    one or more instructions for determining whether a client is SIP (Session Initiation Protocol) enabled;
    one or more instructions for determining a type of request to issue from the client to a Web feed server, the type of request being based on whether the client is SIP enabled;
    in response to determining the client is SIP enabled, one or more instructions for issuing a SIP request for a Web feed to the Web feed server;

one or more instructions for determining that the Web feed server is not compatible with the SIP request in response to receiving a message from the Web feed server indicating that the Web feed server does not support the SIP request method;

one or more instructions for polling the Web feed server in response to determining that the Web feed server is not compatible with the SIP request, where the one or more instructions for polling the Web feed server include:

one or more instructions for sending a Hypertext Transfer Protocol (HTTP) request based on the SIP request; and one or more instructions for receiving the Web feed from the Web feed server in response to sending the HTTP request.

19. The memory device of claim 18, where the SIP request includes a subscribe message.

20. The memory device of claim 18, where the one or more instructions for determining that the Web feed server is not compatible with the SIP request further include:

one or more instructions for determining that the response, from the Web feed server, does not include a 200 class SIP response.

21. The memory device of claim 18, where the one or more instructions for determining that the Web feed server is not compatible with the SIP request further include:

one or more instructions for determining that the response, from the Web feed server, includes a 500 class response.

22. The memory device of claim 18, where the HTTP request includes a get message.

23. A device, comprising:

a memory to store instructions; and a processor to execute the instructions to:

determine whether the device is SIP (Session Initiation Protocol) enabled;

determine a type of request to issue from the device to a Web feed server, the type of request being based on whether the device is SIP enabled;

in response to determining the device is not SIP enabled:

issue a first Hypertext Transfer Protocol (HTTP) request for a Web feed;

intercept the first HTTP request;

translate the first HTTP request to a SIP request;

transmit the SIP request for the Web feed to the Web feed server;

determine that the Web feed server is not compatible with the SIP request, where a message is received at the device when the Web feed server does not support the SIP request method;

in response to determining that the Web feed server is not compatible with the SIP request, transmit a second HTTP request to the Web feed server to receive the Web feed, wherein the second HTTP request is not translated to a SIP request; and receive the Web feed from the Web feed server in response to transmitting the second HTTP request.

24. The method of claim 1, further comprising:

in response to not receiving a response to the SIP request, determining, by the client, that the Web feed server is not compatible with the SIP request.

25. The method of claim 1, where the Web feed server is identified as SIP-enabled in response to the client transmitting a query message to a network.

* * * * *